June 5, 1956 L. H. REAGAN 2,749,389
MANUAL TELEPHONE SYSTEM
Filed Dec. 30, 1952 4 Sheets-Sheet 1

INVENTOR.
LEON H. REAGAN
BY T. L. Bowes
ATTORNEY

INVENTOR.
LEON H. REAGAN
BY T. L. Bowes
ATTORNEY

June 5, 1956 L. H. REAGAN 2,749,389

MANUAL TELEPHONE SYSTEM

Filed Dec. 30, 1952 4 Sheets-Sheet 3

INVENTOR.
LEON H. REAGAN
BY J. L. Bowes
ATTORNEY

June 5, 1956 L. H. REAGAN 2,749,389

MANUAL TELEPHONE SYSTEM

Filed Dec. 30, 1952 4 Sheets-Sheet 4

INVENTOR.
LEON H. REAGAN
BY T. L. Bowes
ATTORNEY

United States Patent Office 2,749,389
Patented June 5, 1956

2,749,389

MANUAL TELEPHONE SYSTEM

Leon H. Reagan, Richland, Wash., assignor, by mesne assignments, to General Dynamics Corporation, a corporation of Delaware Application December 30, 1952, Serial No. 328,707

7 Claims. (Cl. 179—41)

This invention relates in general to manual telephone systems and more particularly to toll switching circuits used between local and toll boards in an office having both common battery and magneto lines.

In a manual telephone office it is often desirable to have the toll board located at a remote point in relation to the local board. The local lines appear on the face of the position or positions at the local board, but not at the toll position. It is necessary, therefore, to employ toll switching trunks between the local and toll boards for the purpose of giving local lines access to toll calls. On an outgoing call the local subscriber's line circuit is switched to the toll board by the local operator via a CLR trunk. On an incoming toll call the call is routed via a toll switching trunk to a switching operator who plugs up the desired line. The toll switching feature is usually provided at only one of the local positions.

One disadvantage in systems of this type heretofore has been that additional transmission loss is introduced into the toll circuit by series and parallel connections to the talking conductors in the toll switching trunk circuits. It has been necessary prior to this invention to have the switching operator set up any ringing frequency or selection for the toll operator and to provide means in the toll switching trunk for translating toll ringing into the proper party selecting ringing. Also, if the toll operator wished to ring back a calling party, it has been necessary to drop the CLR trunk and reconnect to the party through a toll switching trunk.

It is a general object of the present invention to provide transmission lossless toll switching trunks between local and toll boards having universal cord circuits in an office having both common battery and magneto line circuits.

It is a further object of this invention to provide toll switching trunks which have metallic through talking conductors so that all ringing functions can be handled directly from the toll board.

It is a feature of this invention to repeat the characteristic marking of the line circuit to the toll board over the control conductor of the toll switching trunk so that the talking conductors can be carried through the toll switching trunk on a straight metallic basis.

The invention, both as to its organization and method of operation together with objects and advantages thereof, will best be understood by reference to the following specification taken in connection with the accompanying drawings.

The drawings consist of seven figures on four sheets and when arranged according to Figure 7 show the present invention.

Figure 1:
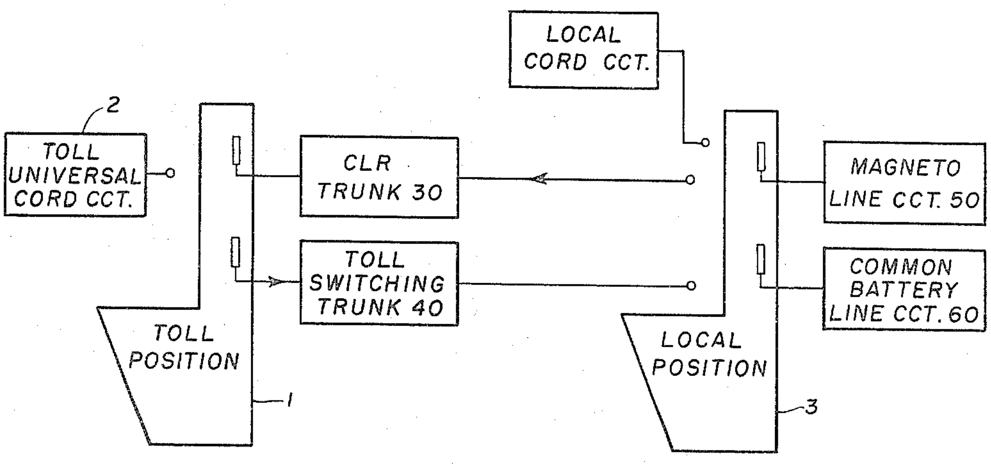
Fig. 1 shows the trunking diagram of the described manual office.
Figure 7:
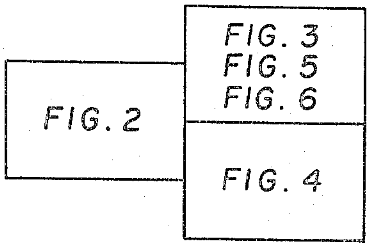
Figure 2:
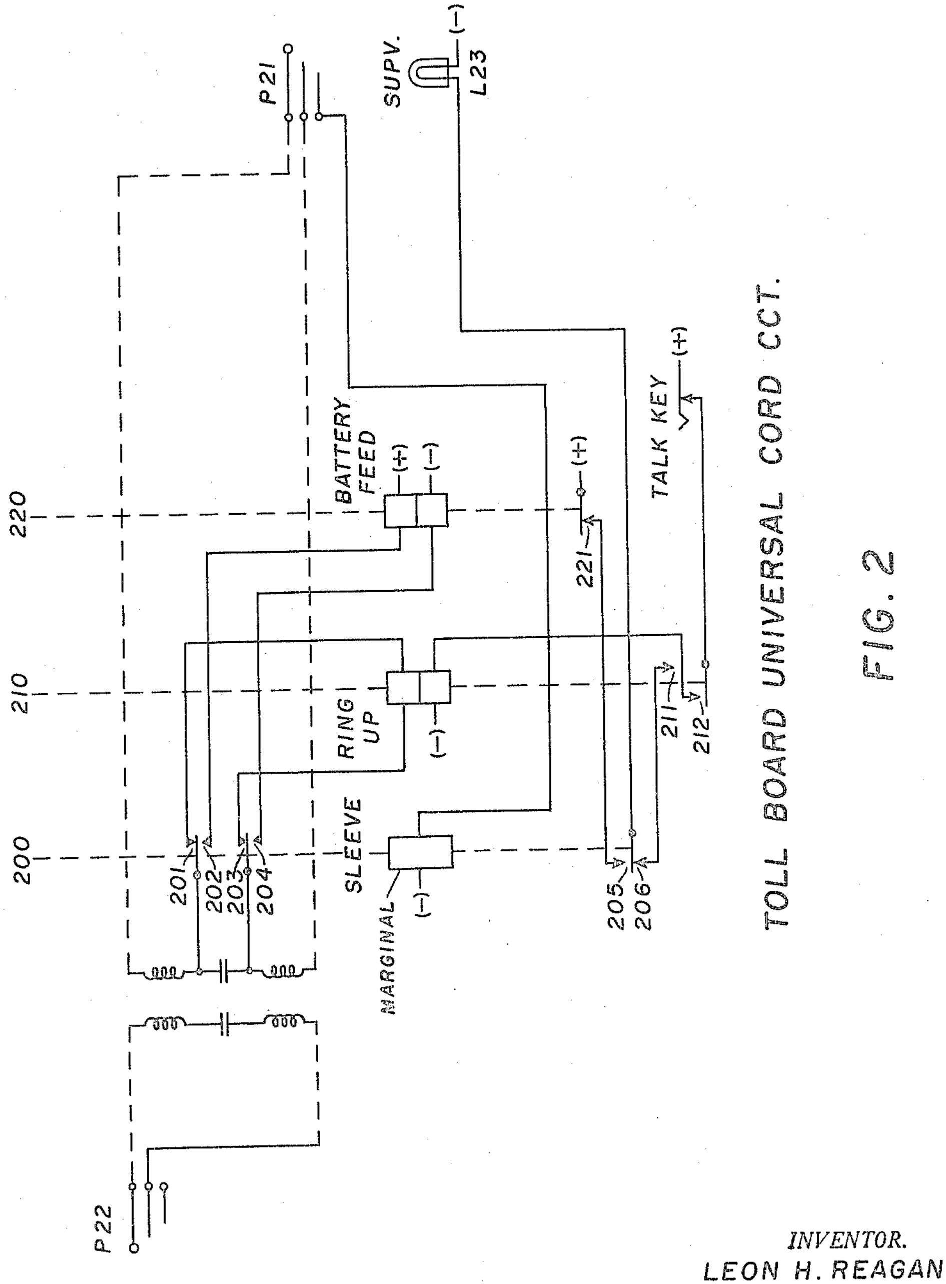
Fig. 2 shows a part of the universal cord circuit at the toll position.
Figure 5:
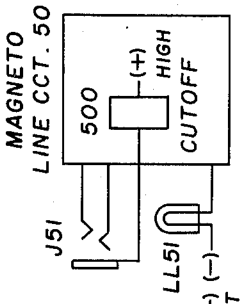
Fig. 5 shows a part of a magneto line circuit and its associated jack at the local board.
Figure 6:
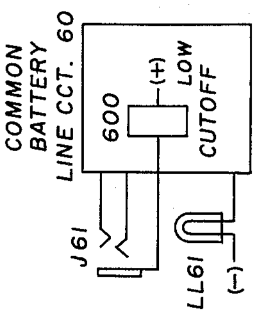
Fig. 6 shows a part of a common battery line circuit and its associated jack at the local board.
Figure 3:
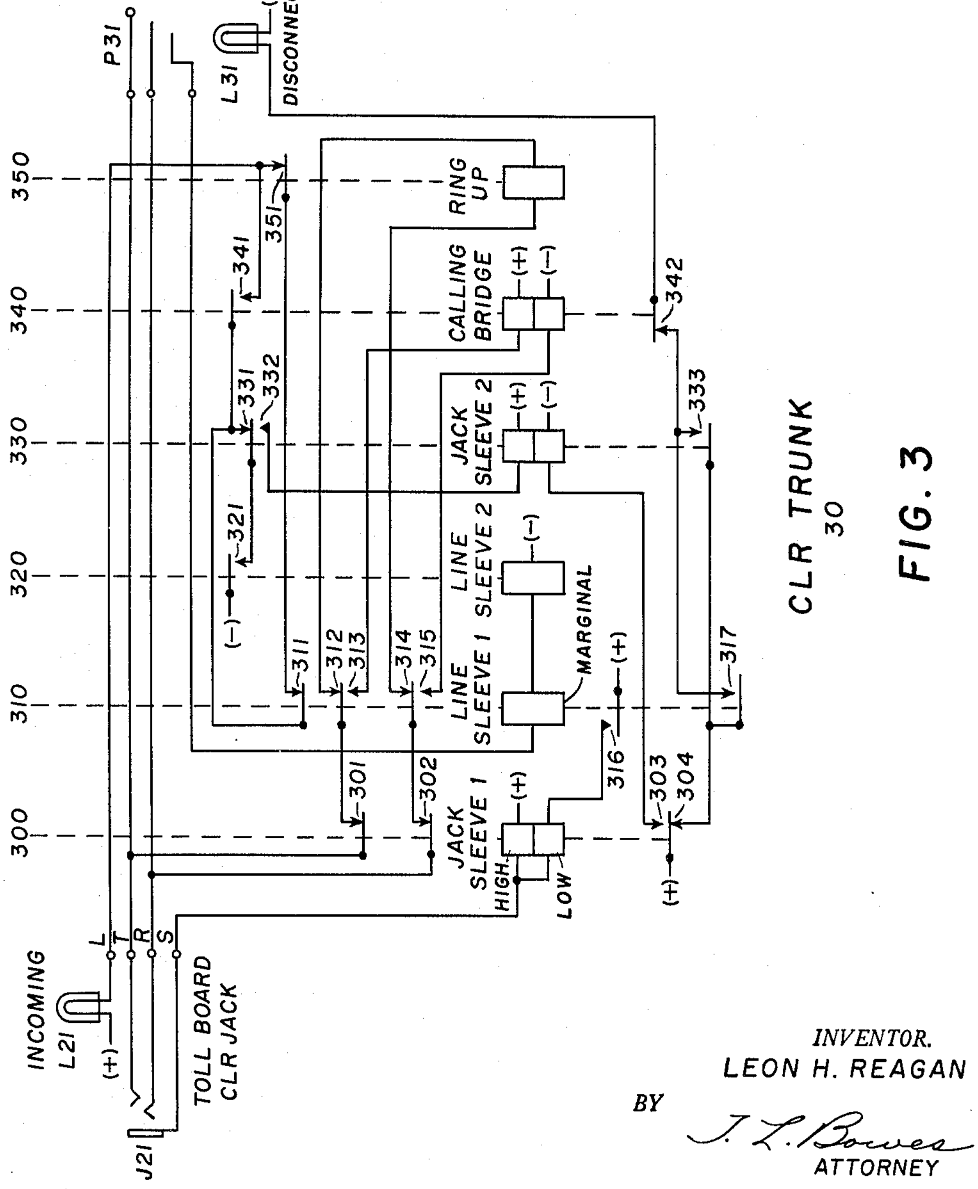
Fig. 3 shows the CLR trunk circuit.
Figure 4:
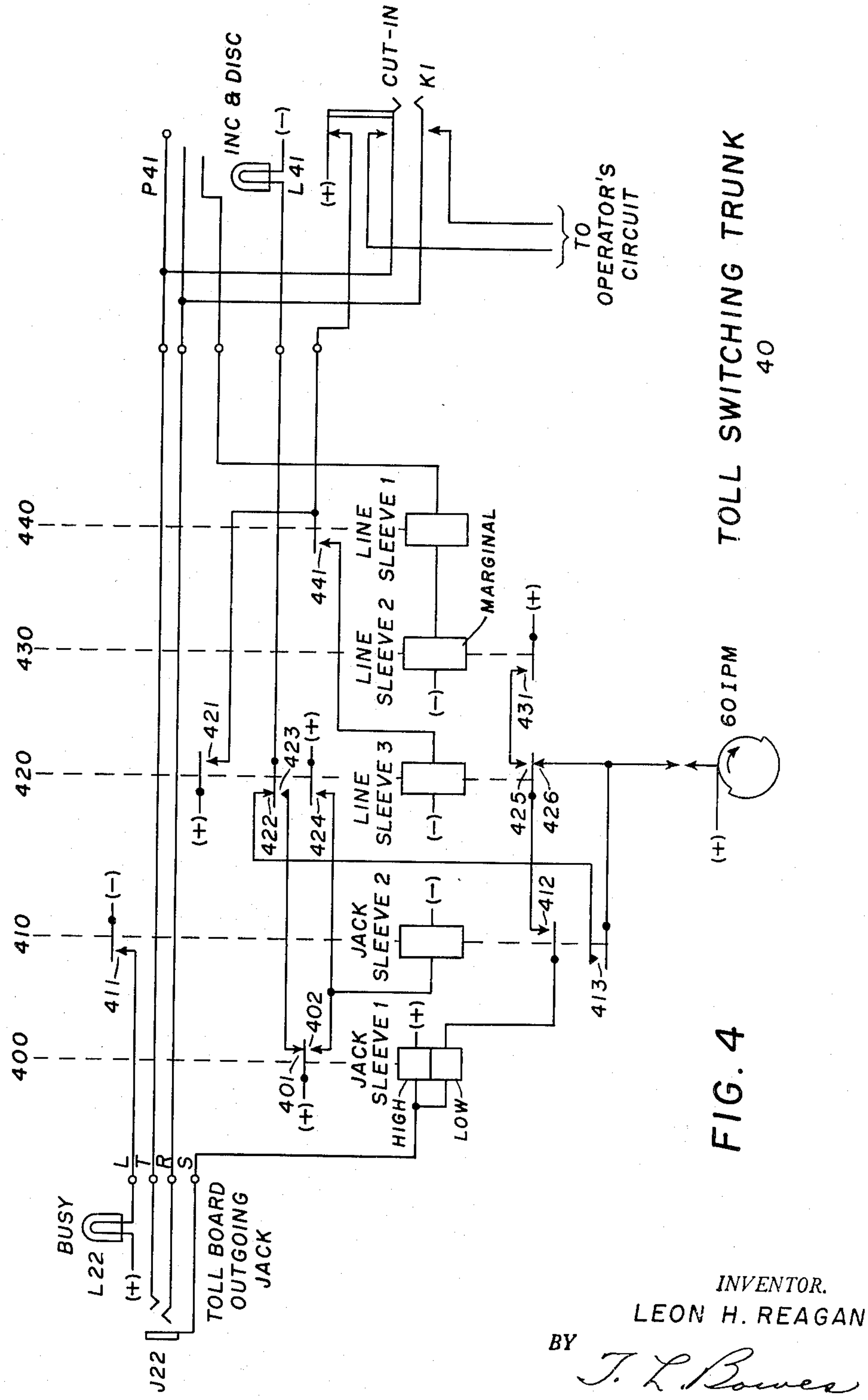
Fig. 4 shows the toll switching trunk circuit.

The general operation of the system can best be understood by reference to the trunking diagram shown in Fig. 1. An inward toll call is extended from a first operator's position, such as toll position 1, by plugging the universal cord circuit 2 into the jack of toll switching trunk 40. Toll switching trunk 40 is plug ended at a second operator's position, such as local position 3, which has access to the local line circuits. The operator at the local position 3 then inserts the plug of toll switching trunk 40 into the jack of the desired line circuit which may be either magneto line circuit 50 or common battery line circuit 60.

On an outward call to toll, the plug originating CLR trunk 30 is plugged into the jack of the originating line circuit by the operator at the local position 3. The CLR trunk terminates in a jack at the toll position 1. The operator at toll position 1 then plugs the universal cord circuit 2 into the jack of CLR trunk 30 to complete the connection.

In the drawings and description the exchange battery is shown as plus and minus and described as ground and battery. It is to be understood that in this system the positive terminal of the battery is grounded and is therefore referred to as ground. The negative terminal of the battery is referred to as battery.

*Incoming toll call to common battery line circuit*

When the toll operator wishes to extend a toll call to a local line circuit, she inserts the plug P21 of the universal cord circuit into the outgoing jack J22 which is connected to toll switching trunk 40. Sleeve relay 200 in the cord circuit is connected in series with the upper winding of relay 400 in the toll switching trunk by way of the sleeve or control conductor of the plug and jack. The resistance of the upper winding of relay 400 is sufficiently high that it prevents the operation of marginal relay 200. Relay 400 operates in this circuit and at contacts 402 closes an operating ground to relay 410. Relay 410 at contacts 411 closes battery to lead L to illuminate the busy lamp L22 associated with trunk 40 at the toll board. 60 I. P. M. ground is connected through normal contacts 426 of relay 420 and through operated contacts 412 of relay 410 and through the lower winding of relay 400 to the sleeve or control conductor. The resistance of this latter winding is sufficiently low that marginal relay 200 in the cord circuit operates each time that ground appears on the 60 I. P. M. lead. The operator's supervisory lamp L23 associated with the universal cord circuit is thus flashed at 60 I. P. M. through normal contacts 221 on relay 220 and operated contacts 205 of relay 200. 60 I. P. M. ground is also routed through operated contacts 413 of relay 410 and through normal contacts 422 on relay 420 to flash the incoming and disconnect lamp L41, associated with the toll switching trunk 40, at the local operator's position.

In response to the flashing of lamp L41, the toll switching operator operates key K1 to connect her operator circuit across the talking conductors T and R of the toll switching trunk and ascertain the desired number of the called line from the toll operator. After learning the desired number, which is assumed to be that of line circuit 60, the toll switching operator tests the line in the usual manner for idle or busy. If the desired line is idle, the operator inserts plugs P41 into jack J61 which terminates the common battery line circuit 60. The common battery line circuit 60 is characterized as such by the low resistance of its cutoff relay 600. Relay 600 operates in a series circuit with relays 440 and 430 in the toll switching trunk. Marginal relay 430 and relay 440 operate in this low resistance circuit. When the toll switch operator restores her cut-in key K1, relay 420 operates from ground on normal contacts of key K1 and through operated contacts 441 of relay 440. Relay 420 closes an alternate holding circuit for relay 410 at contacts 424. The 60 I. P. M. flash to the toll operator is cutoff by the opening of contacts 426 of relay 420. The 60 I. P. M. flash to the incoming and disconnect lamp L41 at the local board is cutoff by the opening of contacts 422 of relay 420. The characteristic marking of the common battery line circuit is repeated to the toll position by placing low resistance ground on the control conductor. The path is as follows: ground on operated contacts 431 of marginal relay 430, through operated contacts 425 on relay 420, operated contacts 412 on relay 410, and through the lower winding of relay 400 to the control conductor. Marginal relay 200 in the universal cord circuit operates in series with this low resistance circuit and at contacts 202 and 204 connects battery feed relay 220 to the talking conductors. The operator's supervisory lamp L23 is now illuminated through normal contacts 221 and operated contacts 205.

The toll operator may now ring the called party in the well known manner. When the called party answers, relay 220 operates and at contacts 221 opens the path to supervisory lamp L23. Talking battery is supplied the called party through the windings of relay 220.

When the called party restores his handset, relay 220 in the universal cord circuit releases. The supervisory lamp L23 is illuminated from ground on normal contacts 221 of relay 220 and through operated contacts 205 on relay 200. In response to this signal, the toll operator disconnects plug P21 from jack J22. Relay 400 in the toll switching trunk releases but relay 410 holds operated from locking contacts 424 on relay 420. The incoming and disconnect lamp L41 is now energized from ground on normal contacts 401 of relay 400 and through operated contacts 423 of relay 420. In response to the disconnect lamp, the toll switching operator removes plug P41 from jack J61 to release all operated relays.

*Call from toll to a magneto line circuit*

The call is set up in an identical manner with that described above except that when the toll switching operator plugs the plug P41 into jack J51, marginal relay 430 in the toll switching trunk does not operate in series with cutoff relay 500 of magneto line circuit 50 since the magneto line circuits are characterized as such by having a high resistance cutoff relay. When the operator restores her cut-in key K1, relay 420 operates as before to cut off the flashing of the supervisory lamp L23 in the cord circuit and lamp L41 at the local position, but ground is not connected through the lower winding of relay 400 to the control conductor since relay 430 did not operate. Marginal relay 200 in the cord circuit does not operate in series with the upper winding of jack sleeve relay 400 and thus the ring-up relay 210 is connected to the talking conductors through normal contacts 201 and 203 of relay 200.

All ringing and supervisory functions are now under control of the toll board. At the termination of conversation, the magneto party rings off in the well-known manner. The application of generator potential to the line conductors serves to operate relay 210 in the cord circuit. Relay 210 locks operated from ground on normal contacts of the talk key and through operated contacts 212 of relay 210. The supervisory lamp L23 is illuminated from the same ground and through operated contacts 211 of relay 210 and normal contacts 206 of relay 200. When the toll operator pulls down the connection, relay 400 in the toll switching trunk releases and as before, the incoming and disconnect lamp L41 is energized from ground through normal contacts 401 and through operated contacts 423. When the toll switching operator removes plug P41 from jack J51, all operated relays release.

*Call from common battery line circuit 60 to toll*

In response to the incoming lamp LL61 associated with common battery line circuit 60, the local operator plugs a local cord (not shown) into jack J61. Upon being informed by the calling subscriber that he wishes "long distance," the operator withdraws her local cord and inserts plug P31 of the CLR trunk 30 into jack J61.

Since the common battery line circuit is characterized by a low resistance cutoff relay, relays 310 and 320 in the CLR trunk operate in series with relay 600. The incoming lamp L21 at the toll board is illuminated over conductor L from battery on operated contacts 321 of relay 320 through normal contacts 331 on relay 330, and through operated contacts 341 on relay 340. Battery feed relay 340 operates from the subscriber's loop through normal contacts 301 and 302 on relay 300 and through operated contacts 313 and 315 on relay 310, respectively.

Should the calling party replace his handset before the toll operator answers, relay 340 will release and disconnect the incoming lamp L21 at its contacts 341. Also, the disconnect lamp associated with the CLR trunk will be energized from ground on normal contacts 304 of relay 300 through operated contacts 317 of relay 310 and through normal contacts 342 on relay 340.

However, assuming that the calling party does not hang up, the toll operator, in response to the illumination of incoming lamp L21 which is associated with the CLR trunk at the toll board, inserts plug P21 into jack J21. Sleeve relay 300 in the CLR trunk operates in series with marginal relay 200 in the cord circuit over the sleeve or control conductor of the plug and jack. Relay 200 also operates in this circuit since marginal relay 310 applies ground through its operated contacts 316 and through the lower winding of relay 300 to the control conductor. Relay 330 operates from ground on contacts 303 of relay 300. Relay 330 cuts off the circuit to the incoming lamp L21 and closes a locking circuit for itself through contacts 321 and 332. Relay 200 at its operated contacts 202 and 204 connects relay 220 to the talking conductors and relay 220 operates in this circuit from the subscriber's loop. Relay 300 opens its contacts 301 and 302 to release relay 340 and thus remove all attachments from the talking conductors in the CLR trunk.

As before, all supervisory functions are relayed directly to the toll board and re-ring functions are handled from the toll board. When the calling party restores his handset, relay 220 in the cord circuit releases and the supervisory lamp L23 at the toll position is illuminated from ground through normal contacts 221 of relay 220 and through operated contacts 205 of relay 200. In response to this supervisory signal, the toll operator removes plug P21 from jack J21 and thus releases relay 300 in the CLR trunk. The disconnect lamp L31 associated with the CLR trunk at the local board is illuminated from ground on released contacts 304 of relay 300 and through operated contacts 333 of relay 330 and normal contacts 342 of relay 340. In response to the illumination of the disconnect lamp, the local operator removes plug P31 from jack J61 to release all operated relays.

*Call from magneto line circuit 50 to toll*

This call is identical with the above described call from line circuit 60 to toll except that when the local operator plugs into jack J51 with plug P31, marginal relay 310 does not operate in series with the high resistance of cutoff relay 500. Incoming lamp L21 is illuminated from battery on operated contacts 321 of relay 320, and through normal contacts 331, 311 and 351. Before the toll operator answers, the calling party is able to flash the incoming lamp L21 by energizing ring-up relay 350 which opens the path to incoming lamp L21 at contacts 351. Ring-up relay 350 is energized whenever the calling party utilizes the hand generator, associated with his subset, to connect alternating current to the line.

When the toll operator inserts plug P21 into jack J21, marginal relay 200 in the cord circuit does not operate in the series circuit with relay 300 since relay 310 is not operated to place ground through the lower winding of relay 300 to the control conductor.

All ringing and supervisory functions are performed at the toll board. When the calling party wishes to terminate the conversation, he rings off in the well known manner and thus operates ring-up relay 210 in the cord circuit. Relay 210 locks up as previously described and illuminates the supervisory lamp L23 at the toll position. The disconnect functions are the same as previously described.

In view of the foregoing, it is apparent that there has been provided in a manual office having magneto and common battery line circuits improved toll switching trunks which have substantially no transmission loss.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In a telephone system, a first operator's position having universal cord circuits, a second operator's position, line circuits of different characteristic marking terminating at said second operator's position, a trunk circuit adapted to interconnect said first operator's position and any selected one of said line circuits by way of said second operator's position, said trunk circuit having incoming and outgoing talking and control conductors, means in said trunk circuit for metallically connecting the incoming and outgoing talking conductors, and means in said trunk circuit for repeating the characteristic line circuit marking between the incoming and outgoing control conductors of the trunk circuit.

2. In a telephone system, a first operator's position having universal cord circuits, a second operator's position, line circuits of different characteristic marking terminating at said second operator's position, a trunk circuit adapted to interconnect said first operator's position and any selected one of said line circuits by way of said second operator's position, said trunk circuit having incoming and outgoing talking and control conductors, means in said trunk circuit providing a direct electrical connection between each of the incoming and outgoing talking conductors, and means in said trunk circuit for repeating the characteristic line circuit marking between the incoming and outgoing control conductors of the trunk circuit.

3. In a telephone system, a first operator's position having universal cord circuits which function with common battery and magneto line circuits, a second operator's position, a plurality of common battery and magneto line circuits terminating at said second operator's position, each of said line circuits having talking and control conductors, the control conductors of said line circuits having characteristic electrical marking, a trunk circuit for interconnecting said first operator's position and a selected one of said line circuits by way of said second operator's position, said trunk circuit having incoming line and control conductors adapted to be connected to any one of said universal cord circuits at the first operator's position and outgoing talking and control conductors adapted to be connected to any selected one of said line circuits at the second operator's position, means in said trunk circuit providing a direct electrical connection between each of the incoming and outgoing talking conductors, and means in said trunk circuit for repeating the characterizing electrical marking of the selected line circuit from said outgoing control conductor to said incoming control conductor.

4. In a telephone system, a first operator's position having universal cord circuits which function with common battery and magneto line circuits, a second operator's position, a plurality of common battery and magneto line circuits terminating at said second operator's position, each of said line circuits having talking and control conductors, the control conductors of said line circuits having characteristic electrical marking, a trunk circuit for interconnecting said first operator's position and a selected one of said line circuits by way of said second operator's position, said trunk circuit having incoming line and control conductors adapted to be connected to any one of said universal cord circuits at the first operator's position and outgoing talking and control conductors adapted to be connected to any selected one of said line circuits at the second operator's position, means in said trunk circuit providing a direct electrical connection between each of the incoming and outgoing talking conductors, supervisory signal means, means in the trunk circuit responsive to the connection of any one of said universal cord circuits to said trunk circuit for connecting said supervisory signal means to said incoming control conductor, means responsive to the connection of the trunk circuit to a selected one of said line circuits for disconnecting said supervisory signal means from said incoming control conductor, and means in said trunk circuit for repeating the characterizing electrical marking of the selected line circuit from said outgoing control conductor to said incoming control conductor.

5. In a telephone system, a first operator's position having universal cord circuits which function with common battery and magneto line circuits, a second operator's position, a plurality of common battery and magneto line circuits terminating at said second operator's position, each of said line circuits having talking and control conductors, said common battery line circuits being characterized by a low resistance potential marking on the control conductor, said magneto line circuits being characterized by a high resistance potential marking on the control conductor, a trunk circuit for interconnecting said first operator's position and a selected one of said line circuits by way of said second operator's position, said trunk circuit having incoming line and control conductors adapted to be connected to any one of said universal cord circuits at the first operator's position and outgoing talking and control conductors adapted to be connected to any selected one of said line circuits at the second operator's position, means in said trunk circuit providing a direct electrical connection between each of the incoming and outgoing talking conductors, means in said trunk circuit for repeating a low resistance potential marking from the outgoing control conductor to the incoming control conductor, and means in said trunk circuit for repeating a high resistance potential marking from the outgoing control conductor to the incoming control conductor.

6. In a telephone system, a first operator's position having universal cord circuits which function with common battery and magneto line circuits, a second operator's position, a plurality of common battery and magneto line circuits terminating at said second operator's position, each of said line circuits having talking and control conductors, said common battery line circuits being characterized by a low resistance potential marking on the control conductor, said magneto line circuits being characterized by a high resistance potential marking on the control conductor, a trunk circuit for interconnecting said first operator's position and a selected one of said line circuits by way of said second operator's position, said trunk circuit having incoming line and control conductors adapted to be connected to any one of said universal cord circuits at the first operator's position and outgoing talking and control conductors adapted to be connected to any selected one of said line circuits at the second operator's position; means in said trunk circuit providing a direct electrical connection between each of the incoming and outgoing talking conductors, supervisory signal means, means in the trunk circuit responsive to the connection of any one of said universal cord circuits to said trunk circuit for connecting said supervisory signal means to said incoming control conductor, means responsive to the connection of the trunk circuit to a selected one of said line circuits for disconnecting said supervisory signal means from the incoming control conductor, means in said trunk circuit for repeating a low resistance potential marking from the outgoing control conductor to the incoming control conductor, and means in said trunk circuit for repeating a high resistance potential marking from the outgoing control conductor to the incoming control conductor.

7. In a telephone system, a first operator's position having universal cord circuits which function with common battery and magneto line circuits, a second operator's position, a plurality of common battery and magneto line circuits terminating at said second operator's position, each of said line circuits having talking and control conductors, said common battery line circuits being characterized by a low resistance ground potential on the control conductor, said magneto line circuits being characterized by a high resistance ground potential on the control conductor, a trunk circuit for interconnecting said first operator's position and a selected one of said line circuits by way of said second operator's position, said trunk circuit having incoming line and control conductors adapted to be connected to any one of said universal cord circuits at the first operator's position and outgoing talking and control conductors adapted to be connected to any selected one of said line circuits at the second operator's position, means in said trunk circuit providing a direct electrical connection between each of the incoming and outgoing talking conductors, a first relay in said trunk circuit having a high resistance winding and a low resistance winding, the incoming control conductor being connected to a first terminal of the high resistance winding and to a first terminal of the low resistance winding, the second terminal of the high resistance winding being connected to ground potential, a second relay, a third relay, said second and third relays being connected in series to the outgoing control conductor, the electrical characteristics of said second and third series connected relays being such that when the trunk circuit is connected to a common battery line circuit both said second and said third relays operate, and when the trunk circuit is connected to a magento line circuit only said second relay operates, and means in said trunk circuit for connecting ground potential to the second terminal of the low resistance winding of said first relay, said means including operated contacts of the third relay.

References Cited in the file of this patent

UNITED STATES PATENTS

| | | |
|---|---|---|
| 1,548,110 | Toomey | Aug. 4, 1925 |
| 1,672,006 | Steinke | June 5, 1928 |
| 1,708,960 | Ulrich | Apr. 16, 1929 |